(12) United States Patent
Baier-Welt

(10) Patent No.: US 8,146,715 B2
(45) Date of Patent: Apr. 3, 2012

(54) DISK BRAKE PROVIDED WITH AN IMPROVED DEVICE FOR MEASURING THE NORMAL APPLIED FORCE

(75) Inventor: Christian Baier-Welt, Ober-Ramstadt (DE)

(73) Assignee: Continental Automotive GmbH, Hannover (DE)

( * ) Notice: Subject to any disclaimer, the term of this patent is extended or adjusted under 35 U.S.C. 154(b) by 886 days.

(21) Appl. No.: 11/989,140

(22) PCT Filed: Jul. 11, 2006

(86) PCT No.: PCT/EP2006/064096
§ 371 (c)(1),
(2), (4) Date: Jan. 22, 2008

(87) PCT Pub. No.: WO2007/012560
PCT Pub. Date: Feb. 1, 2007

(65) Prior Publication Data
US 2009/0133971 A1    May 28, 2009

(30) Foreign Application Priority Data
Jul. 25, 2005    (EP) .................................... 05016130

(51) Int. Cl.
*B60T 17/22* (2006.01)
*F16D 65/00* (2006.01)

(52) U.S. Cl. .............. 188/1.11 R; 188/73.1; 188/1.11 E

(58) Field of Classification Search ............. 188/1.11 R, 188/1.11 W, 1.11 L, 1.11 E, 73.1; 303/112, 303/166
See application file for complete search history.

(56) References Cited

U.S. PATENT DOCUMENTS

| 5,522,270 A | 6/1996 | Gissinger et al. | |
| 6,176,352 B1 * | 1/2001 | Maron et al. | 188/1.11 E |
| 2002/0104717 A1 * | 8/2002 | Borugian | 188/1.11 E |

FOREIGN PATENT DOCUMENTS
WO    WO 03/029682 A1    4/2003
* cited by examiner

*Primary Examiner* — Bradley King
*Assistant Examiner* — Vishal Sahni
(74) *Attorney, Agent, or Firm* — King & Spalding L.L.P.

(57) ABSTRACT

A disk brake, in particular for a motor vehicle, is provided. The disk includes a rotatable brake disk, a brake caliper covering the brake disk, an actuator for applying an actuation force and a friction lining applicable to the brake disk by means of the actuation force, and a device for measuring the actual braking force. In order to obtain the more reliable and accurate actual braking force measurement, the device for measuring the actual braking force uses the elastic enlargement of the brake caliper in the form of a measuring parameter and comprises an element having a first end secured to the brake caliper and a second free end, wherein a gap is formed in the extension direction between the brake caliper and the element. The device for measuring the actual braking force produces a signal according to the actual measure gap width.

17 Claims, 2 Drawing Sheets

DISK BRAKE PROVIDED WITH AN IMPROVED DEVICE FOR MEASURING THE NORMAL APPLIED FORCE

CROSS REFERENCE TO RELATED APPLICATIONS

This application is the US National Stage of International Application No. PCT/EP2006/064096, filed Jul. 11, 2006 and claims the benefit thereof. The International Application claims the benefits of European Patent Office application No. 05016130.6 EP filed Jul. 25, 2005, both of the applications are incorporated by reference herein in their entirety.

FIELD OF INVENTION

The present invention relates to a disk brake, in particular for motor vehicles, comprising a rotatable brake disk, a brake caliper covering said brake disk, an actuator for applying an actuation force and friction linings applicable to the brake disk by means of the actuation force, and a device for measuring the actual braking force.

BACKGROUND OF INVENTION

Disk brakes of the type stated are known to persons skilled in the art. The brake caliper can be fashioned as a floating caliper or as a fixed caliper. In hydraulically actuated brakes, a piston which is displaceable in the direction of actuation by means of hydraulic pressure usually serves as an actuator. If the disk brake is an electromechanically actuated disk brake, an electromechanical actuator is used. A self-energizing device can be arranged between such an electromechanical actuator and at least one friction lining, said device automatically amplifying the actuation force generated by the electromechanical actuator in a braking operation and without an addition of external energy. In a disk brake having an electromechanical actuator, in particular, and irrespective of its precise structural design, the actual braking force during operation of the same must constantly be recorded as accurately as possible in order to be able to control the disk brake reliably and accurately such that a braking requirement set by a user of the brake is observed. The term "actual braking force" is understood here to be the force, between the friction linings and the brake disk, acting in a direction perpendicular to the surface of the brake disk, which force is generated in the disk brake when the friction linings are in contact with the brake disk for braking.

In order to determine the actual braking force, the deformation of a sensor element introduced into the force flux of the brake is usually measured. For example, a wire strain gauge can be attached to the brake caliper in order to measure the deformation thereof during a braking operation. The perpendicular force acting on the friction linings, i.e. the force directed at a right angle to the brake disk surface which presses the friction linings on to the brake disk, is frequently used as a measure of the actual braking force. However, force measurement accuracy has previously been inadequate since the sensors used display hysteresis effects and, furthermore, their output signal changes with temperature. The latter is critical because the sensor is generally located close to a friction lining which heats up intensely during braking operations. Integrated circuits, especially the ASICs frequently used in sensors, have problems withstanding the high temperatures which occur in the brake and run the risk of losing information stored in them. Sensor elements, especially strain gauges, used previously fail to meet the demands placed on them in the automotive sector in terms of process-engineering quality and endurance.

SUMMARY OF INVENTION

According to various embodiments, a disk brake having an electromechanical actuator can be provided in which measurement of the actual braking force is possible in a more accurate and reliable manner than hitherto. According to an embodiment, a disk brake for motor vehicles, comprises a rotatable brake disk; a brake caliper covering the brake disk; an actuator for applying an actuation force and friction linings applicable to the brake disk via the actuation force; and a device for measuring the actual braking force, the device uses the elastic expansion of the brake caliper as a measured variable, and the device comprises an element having a first end secured to the brake caliper and a second free end, wherein a gap is formed between the brake caliper and the element along its extension from the first to the second end, and wherein the device measures the actual width of said gap, and emits a signal as a function of the actually measured gap width.

BRIEF DESCRIPTION OF THE DRAWINGS

A preferred embodiment of the invention will be explained in detail below with the aid of the attached schematic diagrams, in which.

DETAILED DESCRIPTION OF INVENTION

Figure 1:
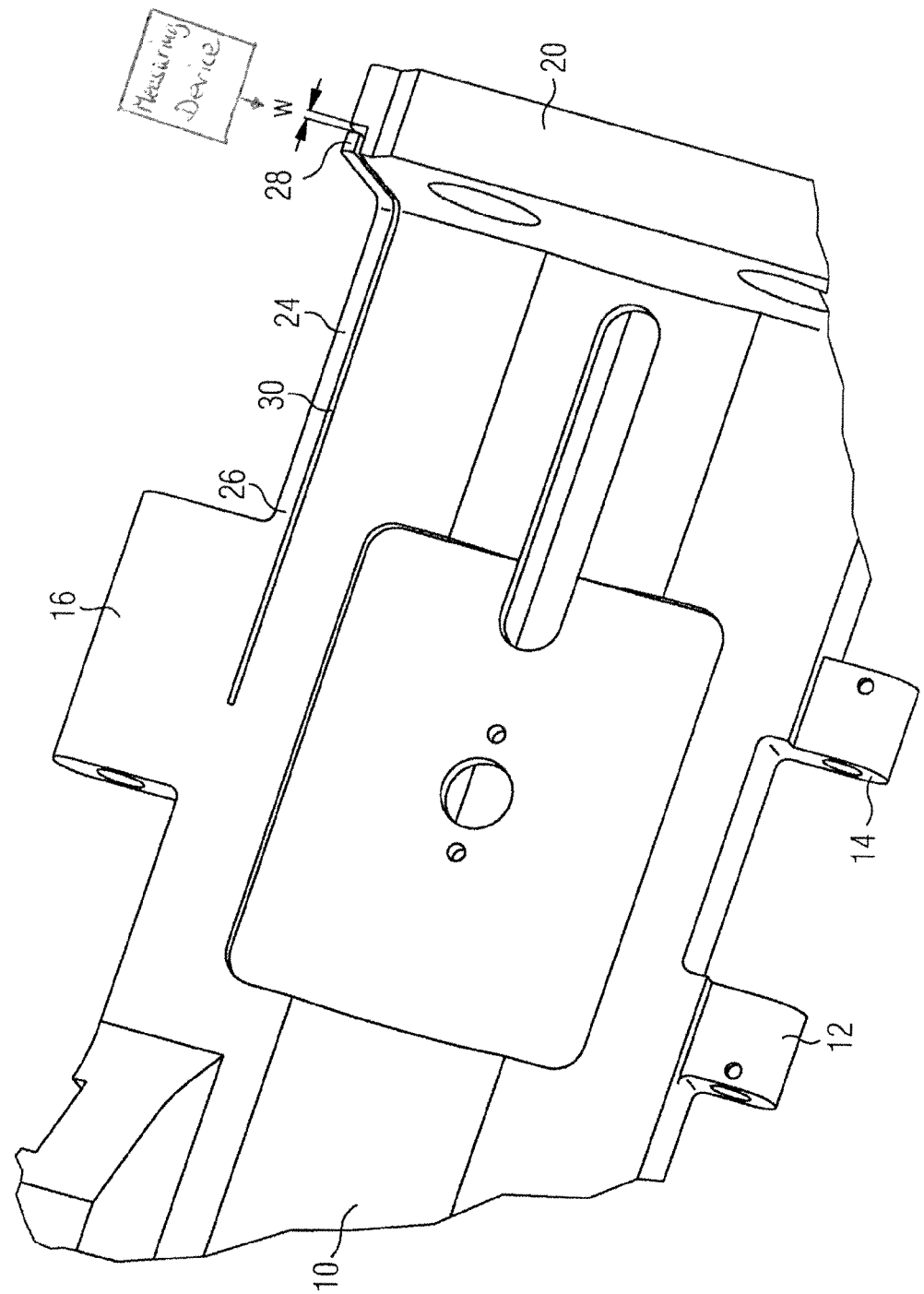
FIG. 1 shows a brake caliper of a disk brake having an electronic actuator in a spatial representation from below.
Figure 2:
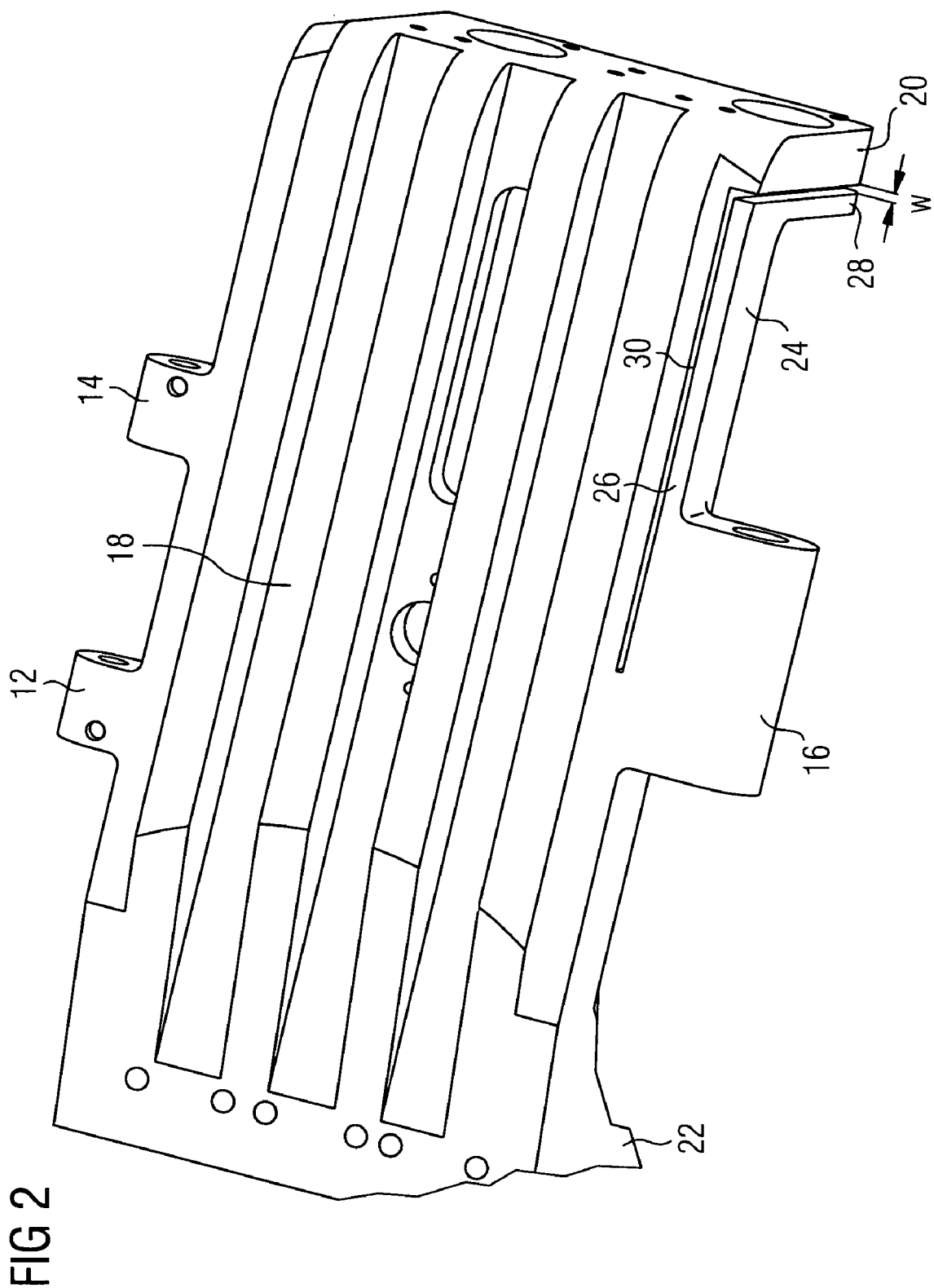
FIG. 2 shows the brake caliper from FIG. 1 in a spatial representation from above.

According to various embodiments, the device for measuring the actual braking force uses the elastic expansion of the brake caliper as a measured variable, the device for measuring the actual braking force comprises an element having a first end secured to the brake caliper and a second free end, a gap being formed between the brake caliper and the element along the extension from the first to the second end, the device for measuring the actual braking force measuring the actual width of said gap, and in that the device for measuring the actual braking force emits a signal as a function of the actual measured gap width. The cited element having its one end secured to the brake caliper is, in particular, bridge-shaped or cantilevered and, due to its configuration, is located with its free end not in the force flux of the brake. The element can be fashioned in one piece with the brake caliper, for example by cutting a gap which is open on one side into the material of the brake caliper, but it can also be fashioned as a separate element and connected in an appropriate manner to the brake caliper. In each case, the element, due to its arrangement not in the force flux of the brake caliper, exhibits no deformation when the brake caliper expands elastically during braking operations. The result is therefore a relative movement between the free end of the element that is non-force-conducting and the brake caliper, leading to a change in the gap width.

In preferred embodiments of the inventive disk brake, the device for measuring the actual braking force has a sensor device which measures the actual gap width in the area of the free end of the element. The sensor device emits a signal as a function of the change in the gap width, said signal being representative of the actual braking force. The sensor device preferably operates according to an electromagnetic principle, for example according to the inductance measurement principle. Where the sensor device operates according to the inductance measurement principle, it comprises in a preferred embodiment at least one coil having a moving ferromagnetic core. In another preferred embodiment of the sensor device, the device operates according to the eddy-current principle. Yet other embodiments operate with a magnet moving relative to the sensor and measure the intensity or the direction of the magnetic-field vector. Preferred embodiments use for this purpose sensors which operate according to the magnetoresistive or the Hall principle.

In yet another preferred embodiment of the inventive disk brake, the sensor device for measuring the actual gap width operates according to the reflex light barrier principle. A light beam is emitted from one side of the gap at a right angle across the gap, reflected back on the other side of the gap via the gap and recorded there by a receiver which measures the intensity of the reflected light and calculates from it the gap width.

In yet another preferred embodiment of an inventive disk brake having a sensor device for measuring the actual gap width, said sensor device measures the ovality and/or size and/or position of an optical light cone projected from one side of the gap to the other side thereof. For this purpose, an arrangement can be used, for example, as is employed in CD players, in order to focus the light beam of a laser diode on to the information track of the CD.

In all embodiments of the inventive disk brake, the device for measuring the actual braking force preferably determines a starting gap width in order to carry out a zero-point calibration, this measurement of the starting gap width taking place when the friction linings are in the released state. This refers to a state in which an air gap exists between at least one friction lining and the brake disk, i.e. the actual braking force is equal to zero in this state. By means of such a zero-point calibration, the accuracy of the device for measuring the actual braking force can be increased in a simple manner.

If the device for measuring the actual braking force comprises a sensor device whose zero point can move as a function of temperature, according to a preferred embodiment, during prolonged braking the friction linings are shifted again to the released status and a further zero-point calibration then carried out by measuring the starting gap width in order to compensate for any thermally induced zero-point drift. Depending on the duration of the braking, the shifting of the friction linings to the released state can be carried out repeatedly. In a vehicle having multiple wheels, this shifting to the released state is carried out sequentially in order that a braking force demanded by the driver can continue to be maintained. In critical driving states, which require for example the intervention of a vehicle stability control system or of an anti-blocking system, this repeated zero-point calibration does not of course occur.

According to another preferred embodiment of the inventive disk brake, in order to compensate for a zero-point drift attributable to thermal influences, the temperature of the brake caliper is recorded at one or more points, the thermally induced expansion of the brake caliper is then determined on the basis of this temperature information and an actually measured value of the gap width, which due to the determined expansion of the brake caliper is affected by a zero-point drift attributable to thermal influences, is then corrected accordingly.

According to yet another preferred embodiment of the inventive disk brake, in order to compensate for a zero-point drift attributable to thermal influences, the temperature of the brake caliper is calculated on the basis of an energy and temperature model of the brake caliper, the thermally induced expansion of the brake caliper is then determined with the aid of the calculated brake caliper temperature and an actually measured value of the gap width, which due to the determined expansion of the brake caliper is affected by a zero-point drift attributable to thermal influences, is then corrected accordingly.

In the two above-described procedures for compensating for any zero-point drift, the thermally induced expansion of the brake caliper can be determined computationally on the basis of the material-dependent thermal expansion coefficients, but it can also be determined with the aid of a table containing values for the expansion of the brake caliper as a function of temperature.

In order to compensate for thermally induced linearity deviations of a sensor of the sensor device, the actual temperature of said sensor is measured and the linearity deviation of the sensor produced by the measured temperature is compensated for by means of an individual temperature coefficient.

In preferred embodiments of the inventive disk brake, the device for measuring the actual braking force is calibrated by means of a measured-value table containing brake caliper expansion values recorded by a calibration reference sensor as a function of the braking force. Such a table can be generated, for example, at the end of a production line of the disk brake, whereby each individual brake produced undergoes in a calibration station a series of actuation processes with different actuation forces and the brake caliper expansion values recorded by the calibration reference sensor are saved and, after completion of the calibration process, are stored in a suitable electronic component of the brake. In this way, non-linearities of the sensor system can be compensated for by means of a table-guided evaluation as part of signal processing, which further increases the accuracy of the measurement.

FIG. 1 shows a brake caliper 10 of a disk brake, not otherwise shown in further detail, for a motor vehicle, said disk brake comprising a rotatable brake disk, the brake caliper 10 covering the brake disk, an electromagnetic actuator for applying an actuation force and friction linings applicable to the brake disk by means of the actuation force. The brake caliper 10 shown is fashioned as a floating caliper and has guides 12, 14 on its one side and a further guide 16 on its opposite side, by means of which guides it can be displaceably mounted on sliding bolts (not shown).

The brake caliper 10 has, as shown, a U-shaped design overall, with a bridge 18 covering the brake disk (not shown) and arms 20 and 22 extending at right angles thereto in the same direction, said arms being integrally connected to the bridge 18 in the exemplary embodiment shown.

The disk brake also comprises a device with which the actual braking force can be measured. This device uses the elastic expansion of the brake caliper 10 that occurs in braking operations as a measured variable. In order to be able to measure this elastic expansion of the brake caliper accurately and reliably, an element 24, here L-shaped and arm-like, is provided on the brake caliper 10, said element being secured with a first end 26 to the brake caliper 10 and having a second free end 28. A gap 30 having a gap width w runs between the first end 26 and the second end 28 of the element 24 and the adjacent brake caliper 10. In the exemplary embodiment shown, the element 24 is fashioned in one piece with the brake caliper 10, the gap 30 being cut into the brake-caliper material, for example by means of a laser or by a partition wall in the casting tool which is used to produce the brake caliper.

Due to the fact that the element 24 has a free end, it does not play a part in the transfer of forces which occur in the brake caliper when the brake is actuated and which deform said brake caliper elastically. When the brake is actuated, the distance which the two arms 20, 22 have from one another will therefore change as a function of the braking force applied. This phenomenon is termed brake-caliper expansion. Because the arm-like element 24 is subjected to zero force as a result of this free end and the gap 30, it does not play any part in this brake-caliper expansion. The result of this is that the width w of the gap 30 changes in the area of the short arm of the L-shaped element 24 as a function of the braking force applied. This change [Delta]w in the gap width w is measured by a sensor attached in immediate proximity to this part of the gap 30. The sensor generates a signal which is ultimately representative of the braking force applied. Any sensor recording the change in the gap width reliably and accurately is suitable as a sensor.

For zero-point calibration, the initial or starting gap width w0 is measured in the unloaded state. The signal generated by the sensor when this measurement is carried out is stored as the force zero-point in a signal processing unit associated with the brake.

The invention claimed is:

1. A disk brake for motor vehicles, comprising:
   a rotatable brake disk;
   a brake caliper having first and second arms for covering the brake disk;
   an actuator for applying an actuation force and friction linings applicable to the brake disk via the actuation force; and
   a structure allowing for measuring the actual braking force, the structure uses an elastic expansion of the brake caliper due to actuation of the disk brake as a measured variable, and the structure comprises an element extending from a first end secured to the brake caliper to a free end not secured to the brake caliper, the element extending towards but not secured to the first arm of the brake caliper,
   wherein a gap is formed between the brake caliper and the element such that the element is not subjected to braking forces and thus does not experience elastic expansion due to braking forces, and such that actuation of the disk brake causes a displacement of the free end of the non-elastically-expanding element relative to the first arm of the elastically expanding brake caliper, and
   a measuring device that measures the displacement of the free end of the non-elastically-expanding element relative to the first arm of the elastically expanding brake caliper.

2. The disk brake as claimed in claim 1, wherein the element is formed in one piece with the brake caliper.

3. The disk brake as claimed in claim 1, wherein the measuring device comprises an electromagnetic sensor.

4. The disk brake as claimed in claim 3, wherein the measuring device comprises an inductance sensor.

5. The disk brake as claimed in claim 4, wherein the measuring device comprises a coil having a moving ferromagnetic core.

6. The disk brake as claimed in claim 4, wherein the measuring device comprises an eddy-current sensor.

7. The disk brake as claimed in claim 1, wherein the measuring device comprises a reflex light barrier sensor.

8. The disk brake as claimed in claim 1, wherein the measuring device measures at least one of the ovality, size, and position of a optical light beam projecting through the gap.

9. The disk brake as claimed in claim 1, wherein the measuring device determines a starting gap width of said gap in order to carry out a zero-point calibration, and the starting gap width is measured with the friction linings in the released state.

10. The disk brake as claimed in claim 9, wherein during a prolonged braking the friction linings are again shifted to the released state and a further zero-point calibration then carried out by measuring the starting gap width in order to compensate for any thermally induced zero-point drift of the sensor device.

11. The disk brake as claimed in claim 9, wherein the measuring device records the temperature of the brake caliper at one or more points, determines on the basis of this temperature information the thermally induced expansion of the brake caliper and then corrects accordingly an actually measured value of the gap width, which due to the determined expansion of the brake caliper is affected by a zero-point drift attributable to thermal influences.

12. The disk brake as claimed in claim 9, wherein the measuring device for measuring the actual braking force calculates the temperature of the brake caliper based on an energy and temperature model of the brake caliper, determines with the aid of the calculated brake caliper temperature the thermally induced expansion of the brake caliper and then corrects accordingly an actually measured value of the gap width, which due to the determined expansion of the brake caliper is affected by a zero-point drift attributable to thermal influences.

13. The disk brake as claimed in claim 11, wherein the thermally induced expansion of the brake caliper is determined computationally on the basis of the material-dependent thermal expansion coefficients.

14. The disk brake as claimed in claim 11, wherein the thermally induced expansion of the brake caliper is determined with the aid of a table which contains values for the expansion of the brake caliper as a function of the temperature.

15. The disk brake as claimed in claim 1, wherein the actual temperature of a sensor of the measuring device is measured, and a thermally induced deviation of the sensor from linearity is compensated for by means of an individual temperature coefficient.

16. The disk brake as claimed in claim 1, wherein the measuring device is calibrated by means of a table of measured values containing brake-caliper-expansion values recorded as a function of the braking force by a calibration reference sensor.

17. The disk brake as claimed In claim 1, wherein the actuator is an electromechanical actuator.

* * * * *